United States Patent [19]
Scheffer et al.

[11] 3,797,455
[45] Mar. 19, 1974

[54] APPARATUS FOR FORMING A SELF-LOCKING THREADED COUPLING

[75] Inventors: Harry Scheffer, Brackwede; Dieter Schuster, Bielefeld; Paul Linders, Brackwede, all of Germany

[73] Assignee: Bollhoff & Co., Brackwede/Westphalia, Germany

[22] Filed: Mar. 31, 1972

[21] Appl. No.: 240,192

Related U.S. Application Data
[62] Division of Ser. No. 73,091, Sept. 17, 1970.

[30] Foreign Application Priority Data
Sept. 30, 1969 Germany.....................19492274

[52] U.S. Cl. ............................................... 118/308
[51] Int. Cl. .............................................. B05b 7/24
[58] Field of Search ....... 118/4, 308, 317, 620, 622; 151/7

[56] References Cited
UNITED STATES PATENTS

| | | | |
|---|---|---|---|
| 3,095,121 | 6/1963 | Douty et al. | 118/4 X |
| 3,355,533 | 11/1967 | Mistic | 151/7 X |
| 3,416,492 | 12/1968 | Greenleaf | 118/620 |
| 3,422,795 | 1/1969 | Smith | 118/308 |
| 3,557,750 | 1/1971 | Gallagher | 118/308 |
| 3,571,897 | 3/1971 | Heil | 118/622 X |

*Primary Examiner*—Louis K. Rimrodt
*Attorney, Agent, or Firm*—Beaman & Beaman

[57] ABSTRACT

The invention pertains to apparatus for forming a self-locking threaded coupling wherein the threads of the coupling are covered with a layer of thermoplastic synthetic material and the thickness of the layer varies about the circumference of the threaded surfaces to avoid shearing of the synthetic material when the components constituting the threaded coupling are threaded together. The apparatus of the invention constitutes means for applying the synthetic thermoplastic material to the threaded component by employing a gaseous carrier such as air wherein the synthetic material is blown upon the threaded component having the synthetic material affixed thereto. As only preselected portions of the threaded surfaces are to be covered by the synthetic material, the apparatus includes spaced shields for shielding parts of the threaded components from the blown synthetic material, and the apparatus of the invention may be used to coat either interiorly or exteriorly threaded surfaces. The apparatus includes supply and mixing chambers and timed valve control means regulating the duration that the blown synthetic material is placed upon the threaded components.

12 Claims, 5 Drawing Figures

1

APPARATUS FOR FORMING A SELF-LOCKING THREADED COUPLING

CROSS REFERENCE TO RELATED APPLICATIONS

The instant application is a division of our copending U.S. application Ser. No. 73,091, filed Sept. 17, 1970.

BACKGROUND OF THE INVENTION

The invention pertains to apparatus for coating a threaded coupling or threaded surface such that the threaded surface becomes self-locking by the utilization of a thermoplastic synthetic material deposited upon the threads. It is known to provide threads with locking means formed of thermoplastic synthetic material by applying to the threaded region of the nut or screw to be locked peripheral or helically arranged paraxial strips of a synthetic material.

When using axially or helically arranged thermoplastic synthetic material strips for self-locking purposes it is necessary to accumulate the thermoplastic material along a relatively short arcuate portion of the periphery of the individual circles of the thread so that a sufficient locking effect is produced even when a large thread clearance exists. The depressions between the threads must be substantially completely filled, at least in some locations. However, if the threaded member so coated with thermoplastic material is screwed into a mating threaded member wherein little mechanical thread clearance exists, an excessive amount of synthetic material is present which is sheared from its associated thread component. If, such a closely fitting thread connection is disengaged, and the previously coated thread member is mated with another threaded member having a greater clearance than the first threaded member, then the locking effect of the synthetic material has been significantly reduced and lost due to the shearing of the synthetic material. The shearing of the synthetic material thereby unfavorably affects the possibility of reuse of such locking threaded components, and limits the interchangeability of threaded couplings of pairs of threaded members which may constitute a threaded connection.

Also, when using strips of thermoplastic synthetic material extending peripherally of the threaded region, the strips forming a self-contained ring in or on the thread, the thickness of the material must be selected to be such that even with a maximum thread clearance a sufficient locking effect is achieved. Thus, as previously described, peripherally extending strips defined upon threaded members having minimum threaded clearances cause a shearing of the synthetic material, and reuse of the individual thread couplings with a locking means formed of thermoplastic synthetic material is unfavorably affected.

It is an object of the present invention to provide apparatus for forming a self-locking threaded coupling having locking means formed of a thermoplastic synthetic material wherein shearing of partial amounts of the synthetic plastic material from the threaded components does not occur, and the threaded components may be repeatedly effectively used with threaded members having different thread clearances.

SUMMARY OF THE INVENTION

As the function and purpose of apparatus for forming a self-locking threaded coupling in accord with the invention may best be appreciated by understanding the purpose and theory of a self-locking threaded coupling formed in accord with the apparatus constituting the subject matter of this application, a description of the self-locking threaded coupling in accord with the invention is appropriate.

In accord with the inventive concepts of the parent application identified above the heretofore experienced problems of shearing thermoplastic thread locking material from the threaded component due to variation in thread clearances is overcome by varying the radial thickness of the thermoplastic synthetic material deposit on the threaded component throughout the periphery of the thread. In practice, the thickness of the synthetic material with respect to the periphery of the threaded components varies from a maxium thickness to the complete absence of synthetic material such that when the clearances between mating thread members are minimum the excess synthetic material will be peripherally displaced into those portions of minimum radial thickness of synthetic material such that a substantially uniform radial thickness of material exists in the locked threaded coupling and all portions of the threaded coupling contribute to the locking action. In order to most effectively practice the inventive concept the volume of synthetic material deposited upon the threads of a threaded component of the threaded coupling must be approximately of such a value that when threaded couplings having the smallest permissible thread clearance are used, no shearing of the synthetic material takes place.

With a locking layer of synthetic material formed in the aforedescribed manner, when mating threaded couplings of minimum thread clearance there will always be a small amount of synthetic material which will have to be displaced only through a small peripheral distance of the threaded member for forming the locking of the thread connection. As the synthetic material is displaced only a short distance a plastic deformation of the material permits the material to be displaced to those areas capable of receiving material without a shearing off of the material from the threaded members. As only deformation takes place, rather than a shearing and removing action, the threaded members coated in accord with the invention may be repeatedly used without adverse effect to the locking feature.

The peripheral dimension or width of the portions of synthetic material of greatest radial thickness as compared with the peripheral dimension of the portions of minimum or no synthetic material are determined by the variations in the threaded connections permissible. Preferably, four or six portions of maximum synthetic material thickness are defined upon the coated threaded component, and a corresponding number of portions of minimum thickness of synthetic material are defined about the periphery of the threaded component. The number of peripheral portions of greatest and minimum radial thickness of synthetic material depends upon the diameter of the threaded component, and it is desirous that the distance between adjacent widths of maximum and minimum thicknesses be small so that the path of peripheral displacement of the synthetic material is short enough to insure displacement thereof without a shearing of the material. An integral multiple of the periphal width or dimension of the portions covered by the synthetic material corresponds to the circumference of the coated thread region, and the sum of an integral multiple of the peripheral width of the portion of greatest layer thickness and of the same multiple of the peripheral width of the portions of minimum thickness corresponds to the peripheral dimensions.

Additionally, the thickness of the layer of synthetic material measured axially with respect to the threaded component in a direction of the threaded region to be coated to the longitudinal edges thereof preferably decreases so that the threaded member may be easily threaded into the locking region. For the same reason, there is at least one course of threads at the end, or at the beginning of the threaded region which is not covered with a layer of synthetic material to insure easy starting of the threaded component into its mating component.

It is to be understood that the self-locking arrangement utilizing the inventive concept may be formed on the inner threads of a nut, as well as on the exterior threads of a screw or bolt.

In the process of forming a self-locking threaded coupling in accord with the invention, the threaded coupling is heated prior to the application of the thermoplastic synthetic material thereon, and the synthetic material is in a powder form of a very fine granulation which is mixed with a gas, such as air, and is blown onto preselected sectors of the threaded region to be coated. The outer synthetic material melts upon engaging the thread coupling component and the apparatus for depositing the powder upon the threaded coupling produces the variation in radial thickness of the synthetic material throughout the periphery of the threaded component. Polyamide powder is a suitable synthetic material powder for use in the invention.

The apparatus for implementing the coating of the self-locking threaded couplings in accord with the inventive concept employs a heating device, a mixing device for mixing the synthetic material powder with a transporting or carrier gas, and a blow-on or nozzle device with shields arranged in the flow of the blown gas and powder permits different amounts of synthetic material powder to be deposited upon the various sectors of the threaded region to be coated. A valve controls the flow of gas and powder to the nozzle depositing device, and in order to accurately control the amount of synthetic material deposited upon the threaded component, the valve is timed by a timing switch. Preferably, heating of the threaded component is accomplished by induction heating.

The blow-on or nozzle device for coating the interior threads of a nut, for instance, essentially consists of annular flange connected with the supply line associated with a circular disc which are interconnected by shields peripherally spaced with respect to each other. The shields of equal height are arranged on the periphery of a circle, the diameter of which is smaller than or equal to the diameter of the circular disc, and the disc is of a diameter substantially equal to that of the annular flange.

The nozzle device for covering exterior threads essentially consists of an annular flange and a cylindrical portion which are connected with each other by shields spaced from each other, the outer peripheral region of the shields being connected with the pipeline which supplies the gas and powder mixture. The shields of equal dimension which preferably extend vertically with respect to the annular flange are arranged as the periphery of a circle having a diameter which is greater than or equal to the inner diameter of the annular flange with the inner diameter of the cylindrical portion equal to the inner diameter of the annular flange.

With both nozzle devices for depositing synthetic material on interior and exterior threads, the individual shields may be either planar and arranged tangentally with respect to the circle upon which they are mounted, or they may be curved and arranged as segments of the circle. The form of the shield is governed by the desired flow behavior in the region outside of the shield. The width of the individual shields and the distance of the shields from each other may be the same in each case, and the peripheral width of the shields may be smaller, equal to, or greater than the spacing between adjacent shields. The proportions of the widths of the shield and the spacing therebetween, govern the circumferential width of the individual portions of greater or lesser thickness of layer of synthetic material, and the transition between the sections of different layer thicknesses being gradual. The number of shields determines the frequency of the peripheral portions of greater thickness of synthetic material, and preferably, four or six shields are employed.

BRIEF DESCRIPTION OF THE DRAWINGS

The invention will now be described in more detail by refer-ence to the following description and accompanying drawings wherein.

DESCRIPTION OF THE PREFERRED EMBODIMENTS

As the function and theory of the apparatus constituting the subject matter of the instant invention can only be fully appreciated by a complete understanding of the form and operation of a self-locking threaded coupling formed by the apparatus, a description of the coupling components, and the mode of operation follows, as well as a description of the apparatus for forming a self-locking threaded coupling.

Figure 1:
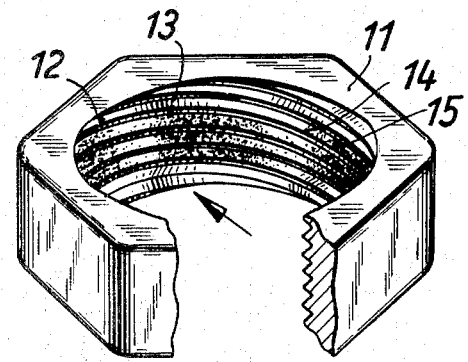
FIG. 1 shows a partial perspective view of a self-locking nut formed in accord with the inventive concept formed by the apparatus of the invention.
Figure 2:
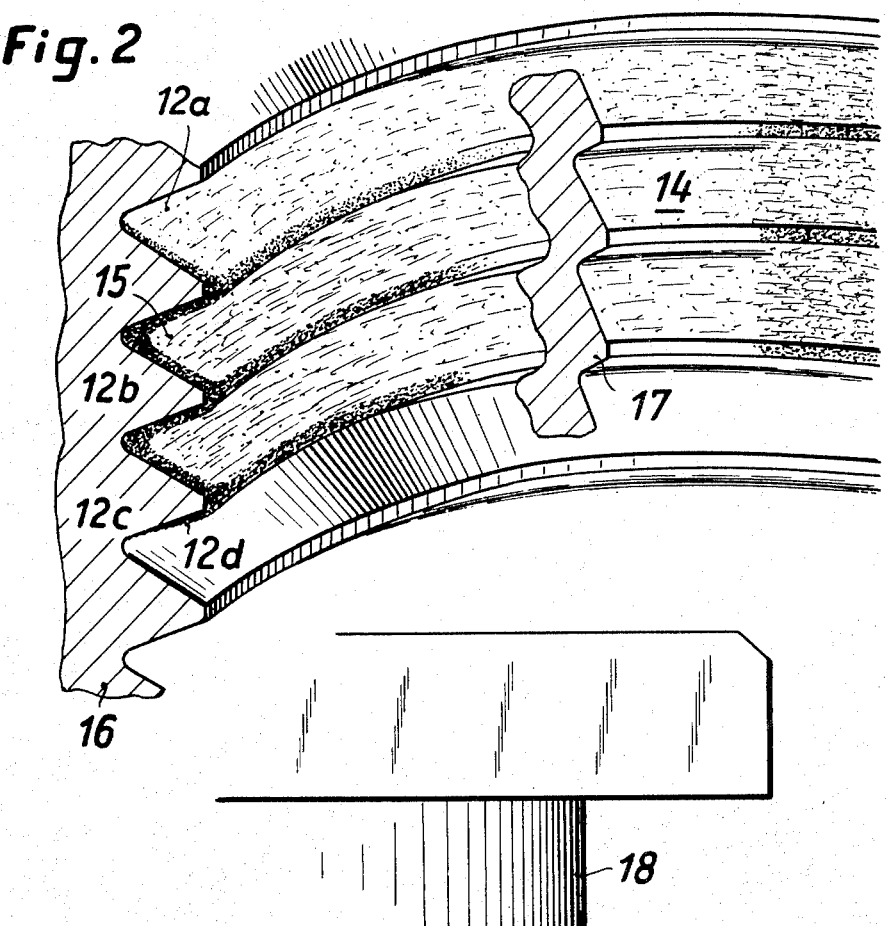
FIG. 2 is a fragmentary, detail, sectioned view of the layered region of the thread of the nut of FIG. 1.

With reference to FIG. 1, a metal hexagon nut 11 is provided with an internal thread 12. In the threaded region of the thread courses 12a and 12d of the thread, the inner thread is coated with a layer 13 formed of thermoplastic synthetic material. The radial thickness of the layer 13 is not constant over the inner periphery of the thread, rather, portions 14 of lesser radial thickness alternate with portions 15 of greater radial thickness. This variation in the radial distribution of the mass of synthetic material throughout the periphery of the threads is appreciated from the radial sectional planes 16 and 17 of FIG. 2. Furthermore, the sectional view of FIG. 2 illustrates that the flanks of the courses of threads 12b and 12c are covered with a thicker layer of synthetic material than the adjacent flanks of the courses of threads 12a and 12d.

When the nut 11 is screwed onto a threaded bolt of synthetic the threaded portion of a screw, not shown, the locking effect will be dependent upon the clearance existing between the nut 11 and the screw or bolt. If the clearance between the threads of the nut and bolt components is at a maximum, only the synthetic material portions 15 of maximum radial thickness will produce the locking action between the threaded components. If, however, the clearance between the threads of the nut 11 and the bolt or screw are minimal, a portion of the synthetic material at the thickest regions 15 will be displaced into the regions 14 of lesser radial thickness. However, in view of the fact that the maximum and minimum thicknesses synthetic material vary throughout the periphery of the nut, the material at the greater thickness portion 15 will be only displaced by deformation into the regions 14, and the degree of deformation is not sufficient to shear a synthetic material from the nut. The deformation that takes place is of a plastic nature and when the nut is removed from the bolt or screw, the synthetic material remains firmly secured to the nut and the nut may be effectively reused and its self-locking characteristics will not be impaired.

In the embodiment shown in FIG. 1 with respect to nut 11, the width of the portions 15 of greater synthetic material thickness measured in the peripheral direction is greater than the width of the portions 14 of minimum thickness of synthetic material layer. The number of portions of different thicknesses is six, and the transition between minimum and maximum thickness areas is uniformly gradual. The sum of six times the width of the portions of greater thickness of layer and six times the width of the portions of minimum layer thickness correspond to the complete inner periphery of the thread 12.

The selection of the peripheral width of the portions 14 and 15 is dependent upon the desired locking effect and the static distribution of the clearance between the threaded components to be interconnected. When the synthetic material is applied, care is taken that only enough synthetic material is applied to the threads that the smallest permissible clearance between the threads of the components does not cause a shearing of the material, but rather only a plastic deformation of the material takes place.

Figure 3:
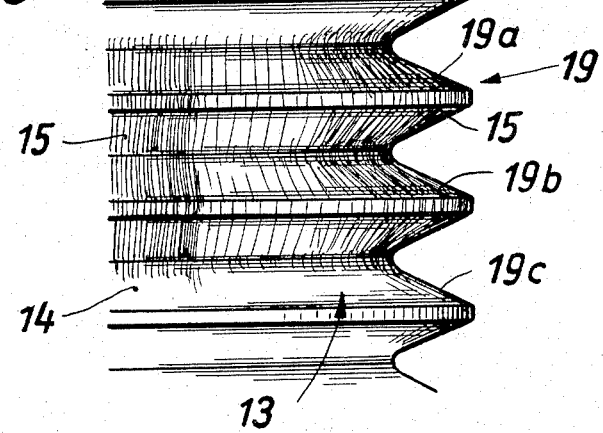
FIG. 3 is an enlarged detail elevational view of a self-locking screw as coated by the apparatus in accord with the invention.

A screw 18 is shown in FIG. 3 having an outer thread 19 wherein the thread courses 19a to 19c are covered with a layer 13 of thermoplastic synthetic material. Looking in a peripheral or circumferential direction, the portions 14 are of lesser thickness of synthetic material and the flanks of the courses of threads 19a and 19c adjacent course 19b, are likewise covered with a slightly thinner layer of material than the corresponding portions of the course of thread 19b. As with nut 11, in screw 18 the courses of the thread at the end and at the beginning of the threaded region are not covered with a layer of synthetic material in order to facilitate the initial thread engagement between threaded components to be interconnected.

Figure 4:
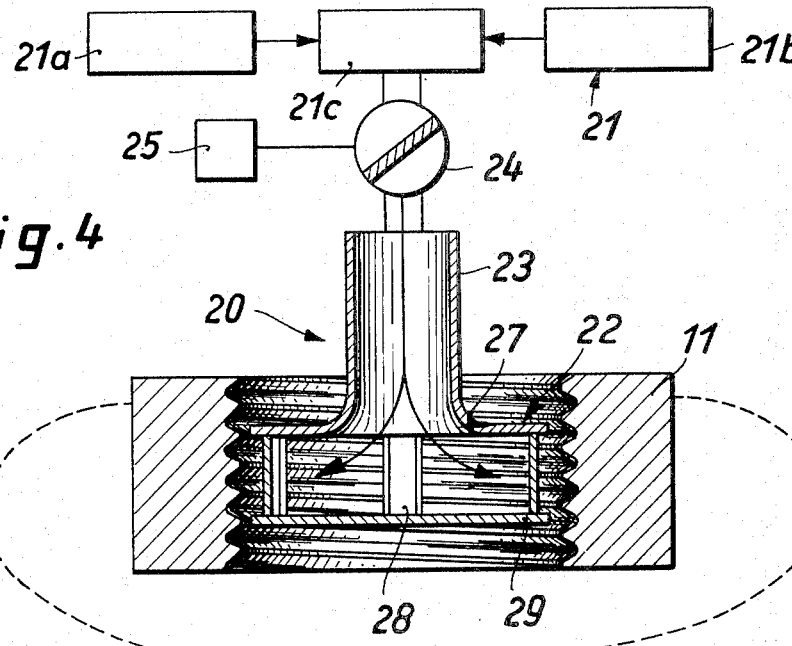
FIG. 4 is a partially schematic view describing the apparatus for covering a threaded coupling in accord with the invention having an internal thread, the threaded component and nozzle device being shown in elevational sectional view.
Figure 5:
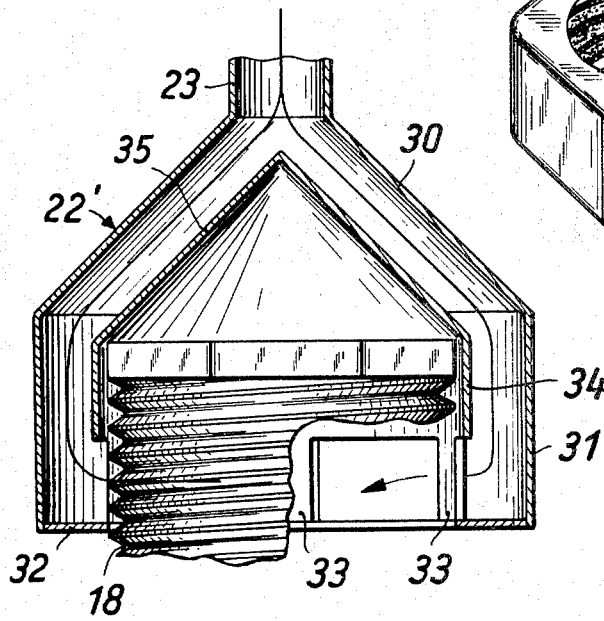
FIG. 5 is an elevational sectional view of a device for coating an exteriorly threaded coupling in accord with the invention.

FIGS. 4 and 5 illustrate the apparatus for coating threaded components in accord with the inventive concept described above. Basically, the threaded component to be coated is heated and the thermoplastic synthetic material 13, in the form a powder, is mixed with a gaseous carrier, such as compressed air, and is blown onto the sections or portions of the threaded region of the threaded component to be covered. The application of the powder is such that the desired varying radial thickness of the synthetic material as built up by the powder itself as desired.

The apparatus employed is schematically represented in FIG. 4 wherein the layer building apparatus 20 includes a mixing device 21, a blow-on or nozzle device 22, a connecting line 23 interconnects the mixing device 21 with the blow-on nozzle applicator device 22, and a valve 24 is arranged in the connection line 23 for controlling the flow of the air and powder mixture to the nozzle device 22.

The mixing apparatus 21 consists of a source of compressed air indicated at 21a, and the supply container for the synthetic material powder is indicated at 21b. The powder is of a very fine granuation and may be a polyamide. Mixing occurs in the mixing device 21c wherein the synthetic material powder is mixed with the compressed air.

Exact metering of the desired amount of synthetic material to be deposited by the device 22 on the threaded component is achieved by the valve 24 which may be time operated by a timing switch 25. The exact construction of the components 21a, 21b, 21c, 24 and 25 does not form a part of the present invention and a number of available devices may be used for the described purpose.

As the threaded component to be coated must be heated prior to application of the synthetic powder, heating means are provided for this purpose, and in FIG. 4 an induction heating coil 26 is utilized.

The blow-on or nozzle device 22 will be of a different construction depending on whether internal or exterior threads are to be covered by the synthetic material.

In FIG. 4 an arrangement for coating inner threads as occur in nut 11 is shown. The supply pipe 23 has connected to the lower end thereof an annular flange 27 which may be either welded to the pipe 23 or may be flanged therefrom. Fastened to the annular flange are a plurality of shields 28 which are of a curved configuration and disposed at right angles to the flange 27. A circular disc 29 is fastened to the free or lower ends of these shields which are of equal height, and the outer diameter of the disc is equal to that of the flange 27. The diameter of the circle upon which the shields 28 are arranged is slightly smaller than the diameter of the circular disc 29. In the embodiment shown in FIG. 4 four shields are spaced from each other, each being separated from the other by an angular distance of 90°, and the width of the shields is substantially less than the distance separating adjacent shields. As the apparatus 22 must be introduced into the threaded bore of nut 11, the outer diameter of the annular flange 27 and the circular disc 29 may be smaller than the inner diameter of the thread 12 as measured from peak of flange to peak of flank.

In a device for coating an exteriorly threaded component in accord with the invention apparatus as shown in FIG. 5 is utilized. In this instance, the lower end of the supply pipe 23 is connected with a truncated cone member 30 which in turn merges with a cylindrical portion 31. The free end of the cylindrical portion 31 is connected with an annular flange 32, the inner diameter of which is greater than the outer diameter of the outer thread to be covered by the synthetic material. Shields 33 extend at equal heights vertically of the lower annular flange 32, said shields being arranged peripherally on a circle, the diameter of which is slightly greater than the inner diameter of the annular flange. The upper ends of the shield 33 are connected with a circular flange 34 which has a diameter essentially corresponding to the diameter of the circle of arrangement for the shields 33. The upper free edge of the cylindrical flange portion 34 is closed by means of a conical structural member 35 leaving a supply channel for the outer mixture between the truncated structural member 30 and the conical structural member 35 and the two cylindrical portions 31 and 34.

In the following description, the blow-on or nozzle apparatus for threaded components having an inner thread are defined by reference 22 while the similar apparatus for use with external threads employ the reference designation 22'.

After the threaded components 11 or 18 have been heated by induction heating to the necessary melting temperature of the synthetic material powder used, the device 22 is introduced into the threaded component 11, or the threaded coupling 18 is inserted into the device 22'. The desired amount of synthetic powder is blown onto the thread by actuation of the valve 24. The particles of synthetic material impinging on the clean and hot metal immediately melt and then firmly adhere to the thread. As the first layer does not solidify immediately, subsequent particles of synthetic material will likewise melt and contribute to the build up of portions of increased thickness of synthetic material layer. In addition to curved shields which are provided on sectors of the circle of arrangement, planar shields may also be provided which are tangentally fashioned to the circle of arrangement. By the selection of the number, width and distance of the shields from each other a wide variety of arrangements of portions of greater and lesser thickness of synthetic material layer, and the course or configuration of the thickness of the layer itself, may be obtained, and the final thickness of the layer is determined by the duration of the operation of the valve 24. The width of the region of thread to be covered in an axial direction may be determined by changing the spacing between flange point 2 and the circular disc 29, or the spacing between cylindrical portion 34 from the flange 32, and changing the length of the shield connected therewith. The arrows in FIGS. 4 and 5 indicate the direction of flow of gas and powder mixture. The maximum amount of synthetic material will be deposited upon the threaded regions adjacent the space between the shields 28 and 33. The shields 28 and 33 will prevent those thread regions in alignment therewith from being covered by the material, and due to the inability to closely confine the air and powder mixture, and due to radial spacing between the shields and the threads a gradual transition between layered and unlayered threaded regions is produced.

The description describes only two different embodiments of a self-locking threaded coupling in accord with the invention, and only two embodiments of devices for applying the synthetic material layer to inner and outer threads have been described. Modifications to the disclosed embodiments are considered to be within the scope of one skilled in the art without departing from the inventive concept.

We claim:

1. Apparatus for forming a self-locking threaded coupling including a threaded component having a circular threaded surface comprising, in combination, a heating device for heating the threaded component, a nozzle member having an axis and adapted to be located adjacent the threaded component surface, a plurality of shields mounted on said nozzle member aranged in a circle concentric with said axis and circumferentially spaced from each other disposed adjacent and concentric to peripherally spaced regions of the threaded component surface, and means supplying a mixture of a thermoplastic synthetic powder with a carrier gas to said nozzle member, said means including a conduit having a valve therein whereby thermoplastic powder is deposited on the threaded component threaded surface through said nozzle at a plurality of circumferentially spaced locations as determined by said shields upon opening of said valve.

2. Apparatus for forming a self-locking threaded coupling as in claim 1 wherein time control means is operatively connected to said valve.

3. Apparatus for forming a self-locking threaded coupling as in claim 1 wherein said nozzle member includes an annular flange, a circular disc coaxially aligned with said flange and axially spaced therefrom, said shields being interposed between said flange and said disc.

4. Apparatus for foroming a self-locking threaded coupling as in claim 3 wherein said shields are of equal length in the direction of the axis of the threads of the threaded component and are equally spaced from the axis of the threaded component threaded surface.

5. Apparatus for forming a self-locking threaded coupling as in claim 1 wherein said nozzle member includes a housing having an inwardly disposed annular flange and a cylindrical portion defining a recess within said housing for receiving an exteriorly threaded component threaded surface, said shields being interposed between said flange and said cylindrical portion, and said housing communicating with said means supplying said powder and carrier gas mixture.

6. Apparatus for forming a self-locking threaded coupling as in claim 5 wherein said annular flange includes a circular inner edge coaxially aligned with said cylindrical portion and said shields are equally spaced from the axis of said flange inner edge and cylindrical portion.

7. Apparatus for forming a self-locking threaded coupling as in claim 1 wherein said shields are defined upon a circle concentric with the axis of said nozzle member and radially spaced from the threaded component threaded surface.

8. Apparatus for forming a self-locking threaded coupling as in claim 1 wherein the peripheral width of said shields is substantially equal to the peripheral space separating said shields.

9. Apparatus for forming a self-locking threaded coupling as in claim 1 wherein the peripheral width of said shields is greater than the peripheral distance separating the shields.

10. Apparatus for forming a self-locking threaded coupling as in claim 1 wherein the peripheral width of said shields is less than the peripheral spacing between adjacent shields.

11. Apparatus for forming a self-locking threaded coupling as in claim 1 wherein four shields are defined upon said nozzle located at 90° locations with respect to said circle.

12. Apparatus for forming a self-locking threaded coupling as in claim 1 wherein six evenly spaced shields are defined upon said nozzle member upon said circle.

* * * * *